US010711946B2

(12) United States Patent
Fukuda et al.

(10) Patent No.: US 10,711,946 B2
(45) Date of Patent: Jul. 14, 2020

(54) COMBUSTIBLE GAS SUPPLY UNIT AND HYDROGEN STATION

(71) Applicant: Kobe Steel, Ltd., Hyogo (JP)

(72) Inventors: Takayuki Fukuda, Takasago (JP); Kenji Nagura, Takasago (JP); Koichiro Hashimoto, Takasago (JP); Daisuke Wada, Takasago (JP); Takuya Washio, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 36 days.

(21) Appl. No.: 16/046,808

(22) Filed: Jul. 26, 2018

(65) Prior Publication Data

US 2019/0032850 A1 Jan. 31, 2019

(30) Foreign Application Priority Data

Jul. 28, 2017 (JP) ................................ 2017-146584
Feb. 19, 2018 (JP) ................................ 2018-026840

(51) Int. Cl.
*F17C 7/00* (2006.01)
*F17C 1/00* (2006.01)
(Continued)

(52) U.S. Cl.
CPC .................. *F17C 7/00* (2013.01); *F17C 1/00* (2013.01); *F17C 5/06* (2013.01);
(Continued)

(58) Field of Classification Search
CPC ........ F17C 2265/065; F17C 2205/0103; F17C 2260/042
(Continued)

(56) References Cited

U.S. PATENT DOCUMENTS 4,531,558 A * 7/1985 Engel ............... B60K 15/03006
123/525
6,176,046 B1 * 1/2001 Quine ................... E04H 1/1238
290/1 A
(Continued)

FOREIGN PATENT DOCUMENTS

JP   S60-005334 B2   2/1985
JP   2006-022506 A   1/2006
(Continued)

OTHER PUBLICATIONS

Extended European Search Report issued by the European Patent Office dated Nov. 30, 2018, which corresponds to EP18185222.9-1010 and is related to U.S. Appl. No. 16/046,808.
(Continued)

*Primary Examiner* — Kevin F Murphy
(74) *Attorney, Agent, or Firm* — Studebaker & Brackett PC

(57) ABSTRACT

A combustible gas supply unit includes a high pressure gas facility for handling combustible gas which is compressed and a housing provided with a high pressure gas handling area containing the high pressure gas facility. The housing has a portion that is disposed in a side close to a boundary between premises of a hydrogen station and an outer region of the premises and constitutes the high pressure gas handling area, the portion being substantially composed of a partitioning wall member that resists an impact of an explosion of combustible gas.

11 Claims, 9 Drawing Sheets

(51) Int. Cl.
*H01M 8/04082* (2016.01)
*F17C 5/06* (2006.01)

(52) U.S. Cl.
CPC . *H01M 8/04201* (2013.01); *F17C 2205/0103* (2013.01); *F17C 2205/0111* (2013.01); *F17C 2205/0142* (2013.01); *F17C 2205/0323* (2013.01); *F17C 2221/012* (2013.01); *F17C 2227/0337* (2013.01); *F17C 2227/0341* (2013.01); *F17C 2227/0355* (2013.01); *F17C 2260/042* (2013.01); *F17C 2265/065* (2013.01); *F17C 2270/0139* (2013.01); *F17C 2270/0184* (2013.01)

(58) Field of Classification Search
USPC ........................................................ 109/59 R
See application file for complete search history.

(56) References Cited

U.S. PATENT DOCUMENTS

| | | | |
|---|---|---|---|
| 6,810,925 B2 | 11/2004 | Graham et al. | |
| 7,389,661 B2 * | 6/2008 | Viviano | E05B 55/005 70/190 |
| 9,181,078 B2 * | 11/2015 | Cajiga | B60S 5/02 |
| 9,404,623 B2 * | 8/2016 | Kapoor | F17C 13/083 |
| 2003/0056960 A1 | 3/2003 | Del Campo | |
| 2009/0021047 A1* | 1/2009 | Roush | B29C 53/043 296/181.3 |
| 2013/0233388 A1* | 9/2013 | Utal | F17C 5/007 137/1 |
| 2016/0348840 A1 | 12/2016 | Nagura et al. | |

FOREIGN PATENT DOCUMENTS

| | | |
|---|---|---|
| JP | 2013-024287 A | 2/2013 |
| JP | 2013-167288 A | 8/2013 |
| JP | 5399161 B2 | 1/2014 |
| WO | WO-2015125585 A1 * | 8/2015 |

OTHER PUBLICATIONS

An Office Action mailed by the Korean Intellectual Property Office dated Jul. 8, 2019, which corresponds to Korean Patent Application No. 10-2018-0082845 and is related to U.S. Appl. No. 16/046,808; with English language translation.

* cited by examiner

COMBUSTIBLE GAS SUPPLY UNIT AND HYDROGEN STATION

FIELD OF THE INVENTION

The present invention relates to a combustible gas supply unit and a hydrogen station.

BACKGROUND ART

Hydrogen station which is facility for supplying hydrogen gas as a fuel to a fuel cell vehicle as disclosed in Japanese Patent Application Laid-Open No. 2006-22506 (Patent Literature 1) and Japanese Patent Application Laid-Open No. 2013-24287 (Patent Literature 2) are conventionally known. In the premises of the hydrogen station, a hydrogen gas supply unit and a dispenser are provided. The hydrogen gas supply unit has a compressor for compressing hydrogen gas to a high pressure state and supplies the compressed hydrogen gas to the dispenser or an accumulator. The dispenser has a nozzle for supplying the high pressure hydrogen gas supplied from the hydrogen gas supply unit or the accumulator to a fuel cell vehicle. Since hydrogen gas, which is combustible gas, is handled in the hydrogen station, various kinds of safety measures against an explosion of hydrogen gas are considered.

In Patent Literature 1, a protective wall is provided to stand vertically from the ground of the hydrogen station to moderate an impact of the explosion of hydrogen gas. Patent Literature 2 discloses a hydrogen gas supply apparatus including a supporting base, a compressor provided on a top face of the supporting base, an accumulator and a freezer. In the hydrogen gas supply apparatus, the freezer is contained in a housing and partitioning walls are provided between the compressor and the freezer and between the accumulator and the freezer to suppress an explosion of hydrogen gas from affecting the freezer.

The art disclosed in Patent Literature 1 can moderate the impact of the explosion of hydrogen gas by the protective wall but requires high cost for constructing the protective wall. In the hydrogen gas supply apparatus disclosed in Patent Literature 2, the partitioning wall suppresses the impact of the explosion of hydrogen gas from reaching the freezer, while the compressor and the accumulator provided in the apparatus are exposed in the outside. Thus, the impact of the explosion of hydrogen gas reaches the outside of the apparatus, so that the partitioning wall structure is not sufficiently effective.

SUMMARY OF THE INVENTION

It is an object of the present invention is to provide a combustible gas supply unit having an excellent partitioning wall structure with low cost and a hydrogen station including the combustible gas supply unit.

A combustible gas supply unit according to one aspect of the present invention is installed on premises of a facility for supplying combustible gas as a fuel. The combustible gas supply unit comprises a high pressure gas facility for handing the combustible gas which is compressed and a housing provided with a high pressure gas handling area containing the high pressure gas facility. The housing has a portion that is disposed in a side close to a boundary between the premises and an outer region of the premises and constitutes the high pressure gas handling area, and the portion is substantially composed of a partitioning wall member that resists an impact of an explosion of the combustible gas.

A hydrogen station according to another aspect of the present invention comprises the combustible gas supply unit that supplies hydrogen gas which is the combustible gas to an accumulator or a dispenser and the dispenser for supplying hydrogen gas supplied from the accumulator or the combustible gas supply unit to a fuel cell vehicle.

According to the present invention, the combustible gas supply unit having the excellent partitioning wall structure is provided with low cost, and the hydrogen station including the combustible gas supply unit is provided.

DESCRIPTION OF EMBODIMENTS

A combustible gas supply unit and a hydrogen station according to embodiments of the present invention will now be described below in detail with reference to the drawings.

First Embodiment

Figure 1:
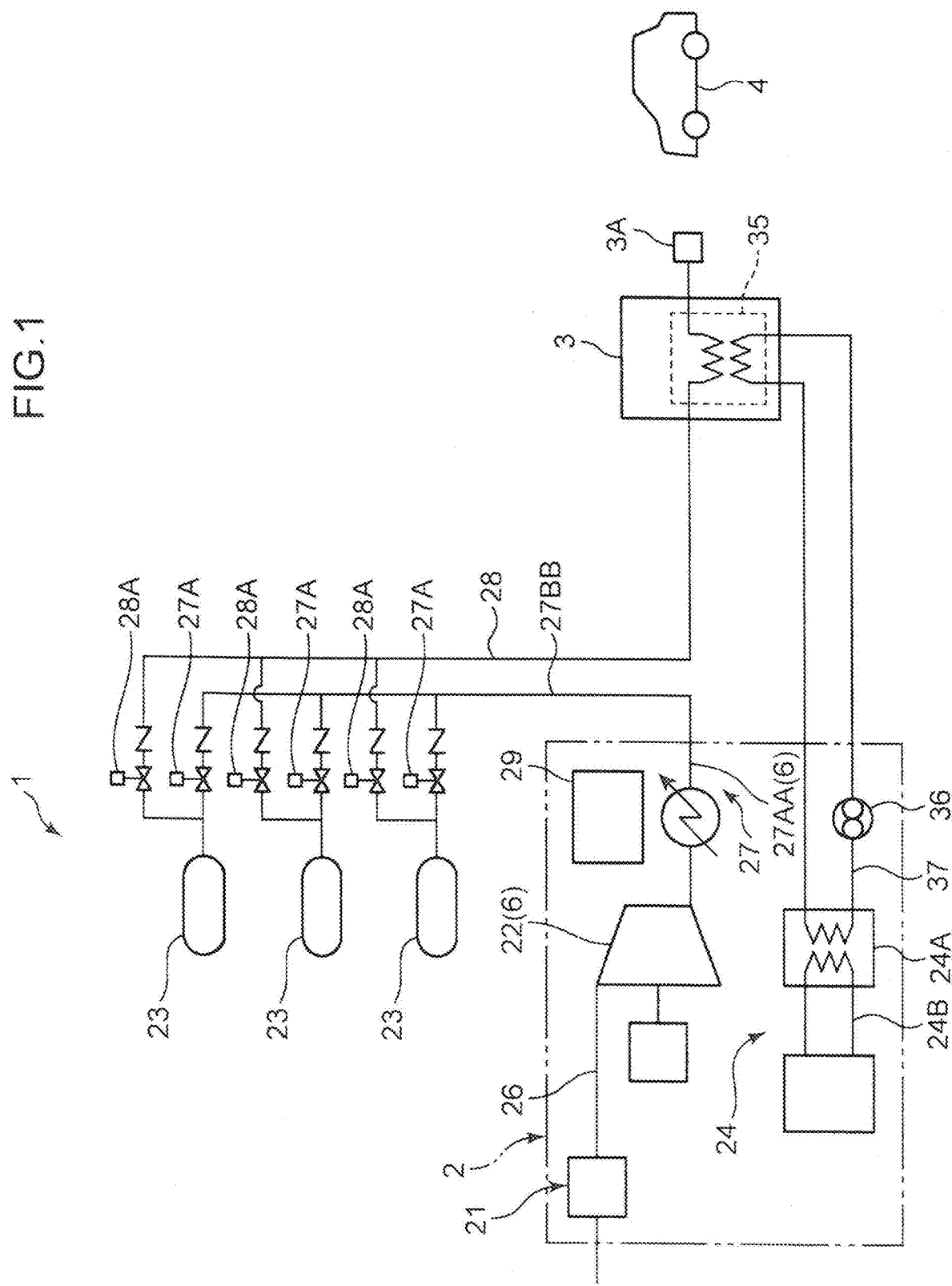
FIG. 1 schematically illustrates an overall configuration of a hydrogen station according to a first embodiment of the present invention.

An overall configuration of a hydrogen station 1 according to a first embodiment of the present invention will be described with reference to FIG. 1. FIG. 1 schematically illustrates main components of the hydrogen station 1.

The hydrogen station 1 is a facility for supplying hydrogen gas (combustible gas) as a fuel to a fuel cell vehicle 4 which is a tank carrying apparatus. As illustrated in FIG. 1, the hydrogen station 1 mainly includes a combustible gas supply unit 2 (hydrogen gas supply unit) that supplies hydrogen gas to an accumulator 23, which will be described later, the accumulator 23 that stores the hydrogen gas supplied from the combustible gas supply unit 2, a gas out-flow line 28 in which the hydrogen gas flown out from the accumulator 23 flows and a dispenser 3 that supplies the hydrogen gas which is supplied from the accumulator 23 through the gas out-flow line 28 to the fuel cell vehicle 4.

The combustible gas supply unit 2 supplies the hydrogen gas compressed to a predetermined high pressure state to the accumulator 23. The combustible gas supply unit 2 includes a receiving unit 21 that receives the hydrogen gas from a reservoir (not shown), a compressor 22 that compresses the received hydrogen gas to a predetermined high pressure state and a gas in-flow line 27 through which the high pressure hydrogen gas flows from the compressor 22 to the accumulator 23.

The compressor 22 and an upstream portion 27AA of the gas in-flow line 27 serves as a high pressure gas facility 6 for handling compressed hydrogen gas. That is, the high pressure gas facility 6 according to the present embodiment includes a facility (the compressor 22) that generates compressed hydrogen gas and a facility (the gas in-flow line 27) in which the compressed hydrogen gas flows. The upstream portion 27AA of the gas in-flow line 27 constituting the high pressure gas facility 6 is connected to an outlet of the compressor 22 and contained in a housing 31 (see FIG. 2) which will be described later. The "high pressure gas facility" of the present invention is not limited to the configuration of the present embodiment but may further include, in addition to the compressor 22 and the gas in-flow line 27, the accumulator 23 and the gas out-flow line 28 as will be described in other embodiments.

The compressor 22 is, for example, a compressor that works with a reciprocating motion (reciprocating compressor). Multiple stages of compressing chambers are provided inside the compressor 22. As illustrated in FIG. 1, a downstream end of a receiving line 26 is connected to an inlet of the compressor 22. The hydrogen gas which is not yet compressed is supplied from the receiving unit 21 to the compressor 22 through the receiving line 26. In each compressing chamber, the hydrogen gas suctioned into a cylinder through a suction port is boosted by a reciprocating piston, and the boosted hydrogen gas is discharged through a discharge port.

For example, three or more stages of compressing chambers are provided inside the compressor 22. The compressor 22 is a large compressor designed to produce a suction pressure of 1 MPa or lower and a discharge pressure of 80 MPa or higher and to suction in an amount of about 300 Nm$^3$/h or more (when the suction pressure is 1 MPa). Thus, a plurality of accumulators 23 can continuously and repetitively be filled with hydrogen gas within a predetermined time (for example, within an hour). The compressor 22 is not limited to a reciprocating compressor but may be, for example, a screw compressor.

The accumulator 23 is a container that stores high pressure hydrogen gas discharged from the compressor 22. In the present embodiment, the plurality of (three) accumulators 23 are provided. Each accumulator 23 has a form of a capsule as illustrated in FIG. 1 and is designed to hold the same pressure (for example, 82 MPa).

The gas in-flow line 27 connects the compressor 22 to the accumulator 23. Specifically, an upstream end of the gas in-flow line 27 is connected to the outlet of the compressor 22, and the downstream end of the gas in-flow line 27 branches by a number corresponding to the number of the accumulators 23 (branches into three lines in the present embodiment). Each branched portion is connected to an inlet and an outlet of the accumulator 23.

As illustrated in FIG. 1, an open-close valve 27A that allows hydrogen gas to flow therein or cuts off the hydrogen gas flow is provided to each branched portion which is in the downstream of the gas in-flow line 27. By opening the open-close valve 27A, the high pressure hydrogen gas discharged from the compressor 22 flows into the accumulator 23 through the gas in-flow line 27.

The gas out-flow line 28 is provided to introduce the high pressure hydrogen gas stored in the accumulator 23 to the dispenser 3. Specifically, the upstream portion of the gas out-flow line 28 branches by a number corresponding to the number of the accumulators 23. Each branched portion is connected to a downstream portion of the open-close valve 27A provided on the gas in-flow line 27. An open-close valve 28A that allows hydrogen gas to flow or cuts off the hydrogen gas flow is provided to each branched portion of the gas out-flow line 28. In such a configuration, by opening the open-close valve 28A with the open-close valve 27A closed, the high pressure hydrogen gas stored in the accumulator 23 is introduced to the dispenser 3 through the gas out-flow line 28.

The combustible gas supply unit 2 includes a freezer 24 used for cooling the compressed hydrogen gas. The freezer 24 includes a coolant path 24B in which a coolant circulates, an evaporating unit 24A provided in the coolant path 24B, a compressing unit, a condensing unit and an expansion unit.

As illustrated in FIG. 1, the evaporating unit 24A is connected to a brine path 37, and heat is exchanged between the coolant flowing in the coolant path 24B and a brine. The coolant evaporates while the brine is cooled. The cooled brine flows into a pre-cooler 35 provided in the dispenser 3 to exchange heat with the hydrogen gas flown into the pre-cooler 35 from the accumulator 23. The compressed hydrogen gas is cooled by the brine. In this manner, the freezer 24 cools the brine, which is a secondary coolant, and is indirectly used for cooling the hydrogen gas.

The compressing unit of the freezer 24 compresses the gaseous coolant flown out of the evaporating unit 24A. The condensing unit exchanges heat between the coolant flown out of the compressing unit and air and thereby condenses the coolant. The expansion unit expands the liquid coolant flown out of the condensing unit. The coolant flown out of the expansion unit flows into the evaporating unit 24A.

The combustible gas supply unit 2 further comprises a controller 29 that controls operations of the combustible gas supply unit 2. For example, the controller 29 comprises an integrated control-board that controls driving of the compressor 22, opening and closing of the open-close valves 27A and 28A, driving of the freezer 24 and driving of the dispenser 3.

The integrated control-board and the components (the compressor 22, the freezer 24, the dispenser 3, etc.) are connected to each other not by individual wires but by a field bus or a field network. The integrated control-board may be configured to perform radio communication with a portable manipulating board, such as a tablet. In this case, the integrated control-board may display various types of data on the portable manipulating board and give manipulating commands to each component through the portable manipulating board. By using the portable manipulating board, the operating status of each component can be monitored and the component can be manipulated from any location in the hydrogen station 1.

The dispenser 3 is for supplying high pressure hydrogen gas, which is supplied from the accumulator 23 through the gas out-flow line 28, to the fuel cell vehicle 4. The dispenser 3 comprises the pre-cooler 35 for cooling hydrogen gas and a nozzle 3A for supplying the hydrogen gas cooled by the pre-cooler 35 to the fuel cell vehicle 4. The nozzle 3A has such a shape that allows the nozzle 3A to be inserted in a supply port (not shown) of the fuel cell vehicle 4.

The pre-cooler 35 is a micro-channel heat exchanger, for example, and exchanges heat between the hydrogen gas and the brine as described above. The hydrogen gas cooled by the brine is supplied to the fuel cell vehicle 4 through the nozzle 3A. The brine that has absorbed heat from hydrogen gas by heat-exchange is sent to the evaporating unit 24A by a brine pump 36 and cooled again by the coolant flowing in the coolant path 24B.

As described above, direct heat exchange is not performed between the coolant of the freezer 24 and the hydrogen gas, but cold energy generated in the freezer 24 is temporarily stored in the secondary coolant, such as the brine, and thereby the hydrogen gas can efficiently be cooled. The secondary coolant is not limited to the brine, and for example, liquefied carbon dioxide can be used instead of the brine.

Figure 2:
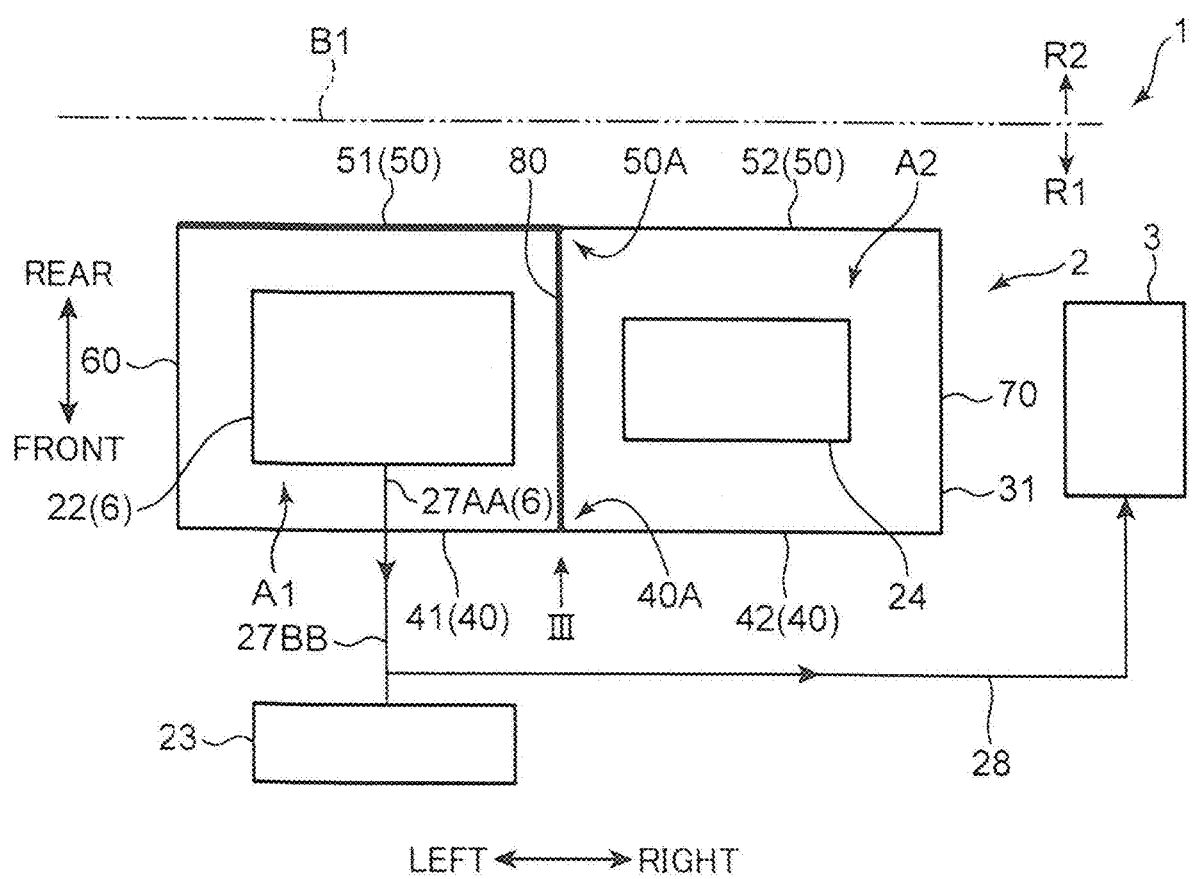
FIG. 2 schematically illustrates a top view of a configuration of a combustible gas supply unit according to the first embodiment of the present invention.
Figure 3:
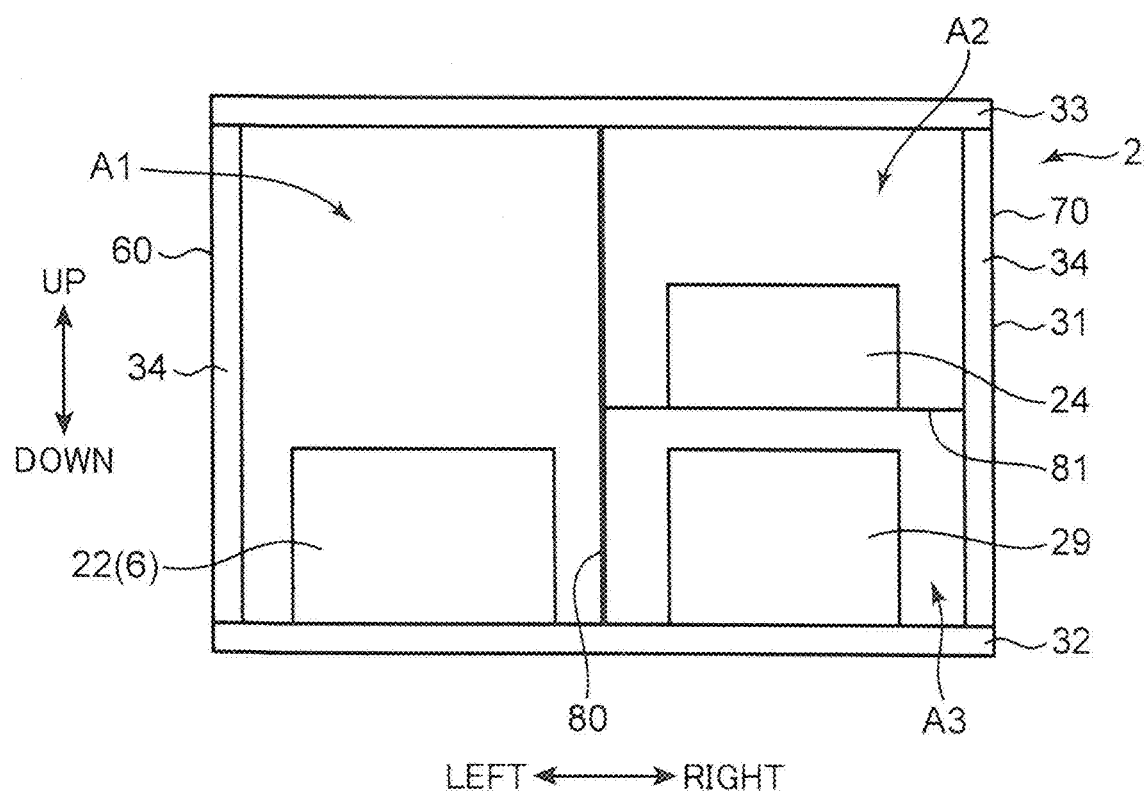
FIG. 3 schematically illustrates a side view of a configuration of the combustible gas supply unit according to the first embodiment of the present invention.

Now, the configuration of the combustible gas supply unit 2 will be described in more detail with reference to FIGS. 2 and 3. The combustible gas supply unit 2 comprises the housing 31 that houses the high pressure gas facility 6 (the compressor 22 and the upstream portion 27AA of the gas in-flow line 27), the freezer 24 and the controller 29. FIG. 2 is a schematic view of the combustible gas supply unit 2, where the housing 31 is viewed from above. FIG. 3 is a schematic view of the combustible gas supply unit 2, which is viewed along the direction indicated by arrow III in FIG. 2. As illustrated in FIG. 2, the combustible gas supply unit 2 is installed on the premises R1 of the hydrogen station 1, and located adjacent to a boundary B1 between the premises R1 and an outer region R2 of the premises. Specifically, the combustible gas supply unit 2 is installed within 8 m from the boundary B1. Hereinafter, "up-and-down direction", "front-and-rear direction" and "right-and-left direction" of the combustible gas supply unit 2 are defined as the directions indicated in FIGS. 2 and 3.

The housing 31 is a container having a shape of a rectangular box. As illustrated in FIG. 3, the housing 31 mainly comprises a base plate 32 constituting a bottom face of the housing 31, a top plate 33 constituting a top face of the housing 31 and a plurality of pillars 34 connecting the base plate 32 and the top plate 33. Although not illustrated in the drawings, the housing 31 may further include a beam provided across the two pillars 34.

The base plate 32 has a rectangular shape in a plan view. The compressor 22 and the controller 29 are placed on the top face of the base plate 32. The base plate 32 is fixed on the ground of the premises R1 of the hydrogen station 1 by, for example, using cement.

The pillars 34 are each substantially composed of, for example, an H-section steel beam and stand upright at corners (four corners) of the base plate 32. In FIG. 3, the only two pillars 34 provided in a front part of the base plate 32 are illustrated. The top plate 33 has a rectangular shape having substantially the same size as the base plate 32 in a plan view. The top plate 33 is provided on top ends of the pillars 34 so as to oppose the base plate 32 along the up-and-down direction.

As illustrated in FIG. 2, the housing 31 includes a front side plate 40, a rear side plate 50, a left side plate 60 and a right side plate 70. These plates constitute side faces of the housing 31. Each of the plates is substantially composed of, for example, a steel panel. These steel panels are disposed perpendicular to the base plate 32 and the top plate 33. The base plate 32, the top plate 33, the front side plate 40, the rear side plate 50, the left side plate 60 and the right side plate 70 constitute an internal space of the housing 31.

The front side plate 40 constitutes a front face of the housing 31. The rear side plate 50 constitutes a rear face of the housing 31 and opposes the front side plate 40 along the front-and-rear direction. As illustrated in FIG. 2, the rear side plate 50 is disposed in the side close to the boundary B1 between the premises R1 and the outer region R2 of the premises of the hydrogen station 1. The front side plate 40 is disposed farther from the boundary B1 than the rear side plate 50.

The front side plate 40 includes a first front side plate 41 constituting a left front face of the housing 31 and a second front side plate 42 that constitutes a right front face of the housing 31 and is disposed adjacent to the first front side plate 41 along the right-and-left direction. The rear side plate 50 includes a first rear side plate 51 constituting a left rear face of the housing 31 and a second rear side plate 52 that constitutes a right rear face of the housing 31 and is disposed adjacent to the first rear side plate 51 along the right-and-left direction. As illustrated in FIG. 2, the first front side plate 41 and the first rear side plate 51 oppose each other along the front-and-rear direction, and the second front side plate 42 and the second rear side plate 52 oppose each other along the front-and-rear direction.

The left side plate 60 constitutes a left side face of the housing 31. As illustrated in FIG. 2, the left side plate 60 extends in the front-and-rear direction from a left end of the first front side plate 41 to a left end of the first rear side plate 51.

The right side plate 70 constitutes a right side face of the housing 31 and opposes the left side plate 60 along the right-and-left direction. As illustrated in FIG. 2, the right side plate 70 extends in the front-and-rear direction from a right end of the second front side plate 42 to a right end of the second rear side plate 52.

The front side plate 40 (the first and second front side plates 41 and 42), the rear side plate 50 (the first and second rear side plates 51 and 52), the left side plate 60 and the right side plate 70 are each fixed to the base plate 32, the pillars 34 and the top plate 33 by welding entire joined sections. The method of fixing the side plates is not limited to the method described above. For example, fastening members, such as bolts and nuts, may be used for fixing.

As illustrated in FIG. 2, the accumulator 23 is disposed outside the housing 31 so as to oppose the front side plate 40. That is, the accumulator 23 is disposed in the side opposite the boundary B1 with respect to the housing 31. The gas in-flow line 27 includes the upstream portion 27AA (the high pressure gas facility 6) that is contained in the housing 31 and connected to the outlet of the compressor 22, and a downstream portion 27BB that is disposed outside the housing 31 and connected to the inlet and outlet of the accumulator 23.

As illustrated in FIG. 2, the dispenser 3 is disposed on the premises R1 of the hydrogen station 1 so as to be remote from the combustible gas supply unit 2. The gas out-flow line 28 is provided outside the housing 31 to connect the gas in-flow line 27 (the downstream portion 27BB) to the dispenser 3. The accumulator 23 and the dispenser 3 are not necessarily disposed at the locations illustrated in FIG. 2, but may be disposed at any locations on the premises R1.

As illustrated in FIG. 3, the combustible gas supply unit 2 includes a first partitioning plate 80 that partitions a space inside the housing 31 into left and right portions and a second partitioning plate 81 that partitions the space into upper and lower portions. Similarly to the side plates of the housing 31, the first and second partitioning plates 80 and 81 are each substantially composed of a steel panel.

As illustrated in FIG. 2, the first partitioning plate 80 extends, along the front-and-rear direction, from an adjoining section 40A between the first and second front side plates 41 and 42 to an adjoining section 50A between the first and second rear side plates 51 and 52. The first partitioning plate 80 is disposed substantially at a center of the housing 31 in the right-and-left direction, and is parallel to the left side plate 60 and the right side plate 70.

A rear end of the first partitioning plate 80 is fixed to the rear side plate 50 by welding the entire joined section, and a front end of the first partitioning plate 80 is fixed to the front side plate 40 by welding the entire joined section. A top end of the first partitioning plate 80 is fixed to the top plate 33 by welding the entire joined section, and a bottom end of the first partitioning plate 80 is fixed to the base plate 32 by welding the entire joined section. The method of fixing the first partitioning plate 80 is not limited to welding. Fastening members, such as bolts and nuts, may be used for fixing.

The second partitioning plate 81 is disposed substantially in a center of the housing 31 in the up-and-down direction, and extends along the right-and-left direction (horizontal direction) from the right side plate 70 to the first partitioning plate 80.

As illustrated in FIGS. 2 and 3, the space inside the housing 31 is divided into a high pressure gas handling area A1 in which the high pressure gas facility 6 is contained, a freezer area A2 in which the freezer 24 is contained and a controller area A3 in which the controller 29 is contained. In the present embodiment as illustrated in FIG. 3, the controller area A3 is smaller than the freezer area A2 and located below the freezer area A2. By stacking the freezer area A2 and the controller area A3 along the up-and-down direction as described above, the housing 31 can be downsized to reduce an area in which the housing 31 is installed on the premises R1 of the hydrogen station 1. In the controller area A3, the controller 29 is partially or totally contained.

Figure 4:
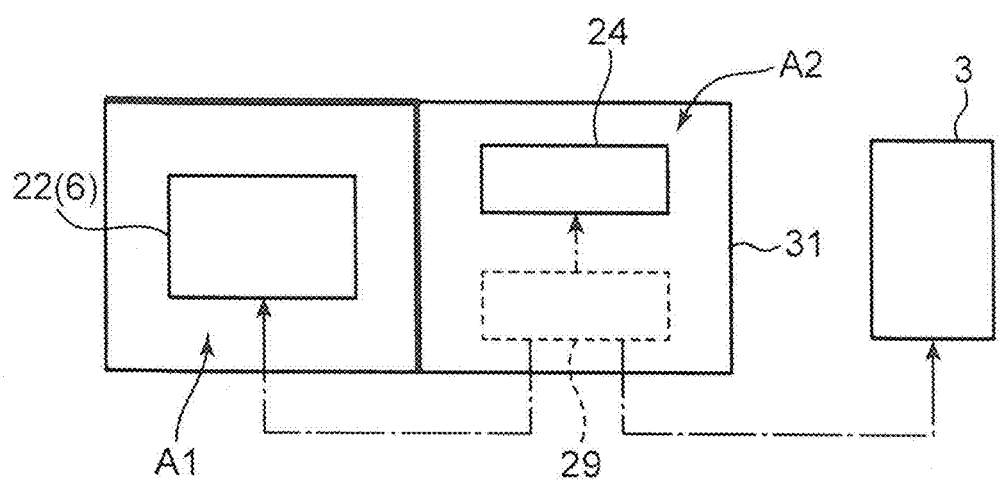
FIG. 4 schematically illustrates connections between a controller and components in the combustible gas supply unit.

In the freezer area A2, a brine circulating apparatus (including the brine path 37 and the brine pump 36) is disposed in addition to the freezer 24. As illustrated in FIG. 4, the controller 29 (integrated control-board) is connected to the high pressure gas facility 6 (including the compressor 22), the freezer 24 and the dispenser 3. The controller 29 controls operations of these components and acquires data from various measuring devices (for example, a pressure sensor and a temperature sensor) provided in the components. The controller 29 is located below the freezer 24, and thus the controller 29 is illustrated in a broken line in FIG. 4. The housing 31 is provided with a ventilation fan that ventilates the areas.

The high pressure gas handling area A1 is a space formed by the base plate 32, the top plate 33, the first front side plate 41, the first rear side plate 51, the left side plate 60 and the first partitioning plate 80. The freezer area A2 is a space formed by the second partitioning plate 81, the top plate 33, the second front side plate 42, the second rear side plate 52, the first partitioning plate 80 and the right side plate 70. The controller area A3 is a space formed by the base plate 32, the second partitioning plate 81, the second front side plate 42, the second rear side plate 52, the first partitioning plate 80 and the right side plate 70.

That is, the freezer area A2 and the controller area A3 are isolated from the high pressure gas handling area A1 by the first partitioning plate 80 (see FIG. 3). In other words, the first partitioning plate 80 extends along the up-and-down direction from the base plate 32 to the top plate 33 so as to isolate the freezer area A2 and the controller area A3 from the high pressure gas handling area A1.

The combustible gas supply unit is required to take safety measures against an explosion of hydrogen gas inside the housing. To meet this requirement, in the combustible gas supply unit 2 according to the present embodiment, the housing 31 has a portion that is disposed in the side close to the boundary B1 between the premises R1 and the outer region R2 of the premises and constitutes the high pressure gas handling area A1, and this portion (the first rear side plate 51) is substantially composed of a partitioning wall member that resists an impact of an explosion of hydrogen gas. Specifically, the first rear side plate 51 is substantially composed of a steel plate complying with JIS (Japanese Industrial Standard) G3193 2008 and having a thickness of 6 mm or more. Therefore, even if the combustible gas supply unit 2 is provided near the boundary B1 (for example, is installed within 8 m from the boundary B1) as illustrated in FIG. 2, the partitioning wall member (the first rear side plate 51) suppresses the impact of the explosion of hydrogen gas from reaching the outer region R2 of the premises.

Furthermore, using a portion of the housing 31 as the partitioning wall member drastically reduces cost. That is, the total cost of the hydrogen station can drastically be reduced compared to a case in which a partitioning wall is constructed on the ground between the combustible gas supply unit 2 and the boundary B1 in FIG. 2.

The housing 31 of the present embodiment has the first rear side plate 51 and the other portions (the front side plate 40, the second rear side plate 52, the left side plate 60 and the right side plate 70). Only the first rear side plate 51 that is disposed in the side close to the boundary B1 between the premises R1 and the outer region R2 of the premises and constitutes the high pressure gas handling area A1 is composed of the partitioning wall member, and the other portions are each substantially composed of a steel panel that has a thickness smaller than that of the steel panel constituting the first rear side plate 51. In this manner, the cost of manufacturing the housing 31 can be reduced compared to the cost of manufacturing the housing 31 that is entirely composed of partitioning wall members.

In the present embodiment, the first partitioning plate 80 is also substantially composed of a partitioning wall member (a steel plate complying with the JIS G3193 2008 and having a thickness of 6 mm or more) that resists the impact of the explosion of hydrogen gas as in the first rear side plate 51. Thus, the first partitioning plate 80 prevents the impact of the explosion of hydrogen gas in the high pressure gas handling area A1 from reaching the freezer 24 and the controller 29.

Now, the characteristics and effects of the combustible gas supply unit 2 and the hydrogen station 1 according to the first embodiment described above will be described.

The combustible gas supply unit 2 according to the present embodiment is installed on the premises R1 of the hydrogen station 1 for supplying hydrogen gas (combustible gas) as a fuel. The combustible gas supply unit 2 comprises the high pressure gas facility 6 for handling the combustible gas which is compressed and the housing 31 provided with the high pressure gas handling area A1 containing the high pressure gas facility 6. The housing 31 has a portion (the first rear side plate 51) that is disposed in a side close to the boundary B1 between the premises R1 of the hydrogen station 1 and the outer region R2 of the premises R1 and constitutes the high pressure gas handling area A1. This portion of the housing 31 (the first rear side plate 51) is substantially composed of a partitioning wall member that resists the impact of the explosion of hydrogen gas.

The hydrogen station 1 according to the present embodiment comprises the combustible gas supply unit 2 that supplies hydrogen gas to the accumulator 23 and the dispenser 3 for supplying the hydrogen gas supplied from the accumulator 23 to the fuel cell vehicle 4.

In the combustible gas supply unit 2, the high pressure gas facility 6 for handling hydrogen gas is contained in the housing 31, and thus the impact of the explosion of hydrogen gas is suppressed from reaching the outside of the housing 31. Furthermore, the first rear side plate 51 of the housing 31 is substantially composed of a partitioning wall member. Therefore, even if the combustible gas supply unit 2 is provided near the boundary B1 as illustrated in FIG. 2, the partitioning wall member suppresses the impact of the explosion of hydrogen gas from reaching the outer region R2. Consequently, an excellent partitioning wall structure can be provided. Furthermore, using a portion of the housing 31 as the partitioning wall member drastically reduces cost compared to constructing an additional partitioning wall on the ground of the premises R1.

The combustible gas supply unit 2 comprises the freezer 24 used for cooling compressed hydrogen gas and the first partitioning plate 80 that partitions the space inside the housing 31 and is substantially composed of a partitioning wall member that resists the impact of the explosion of hydrogen gas. Inside the housing 31, the freezer area A2 that contains the freezer 24 and is isolated from the high pressure gas handling area A1 by the first partitioning plate 80 is provided.

Thus, the first partitioning plate 80 prevents the impact of the explosion of hydrogen gas in the high pressure gas handling area A1 from reaching the freezer 24. The freezer 24 can thus be protected.

The combustible gas supply unit 2 comprises the controller 29 that controls the operation of the combustible gas supply unit 2. Inside the housing 31, the controller area A3 that contains the controller 29 and is separated from the high pressure gas handling area A1 by the first partitioning plate 80 is provided below the freezer area A2.

In this manner, the first partitioning plate 80 prevents the impact of the explosion of hydrogen gas in the high pressure gas handling area A1 from reaching the controller 29, and thus the controller 29 is protected. Since a single partitioning plate can protect both the freezer 24 and controller 29, the number of partitioning plates can be reduced. A worker enters the controller area A3 more frequently than the freezer area A2. Considering the easiness of a worker entering the area, the controller area A3 is preferably provided below the freezer area A2.

In the combustible gas supply unit 2, the housing 31 has a portion (the first rear side plate 51) that is disposed in the side close to the boundary B1 between the premises R1 of the hydrogen station 1 and the outer region R2 of the premises R1 and constitutes the high pressure gas handling area A1, and only this portion (the first rear side plate 51) is composed of the partitioning wall member. In this manner, the housing 31 has an excellent partitioning wall structure and at the same time, the cost of manufacturing the housing 31 can be reduced compared to the cost of manufacturing the housing 31 that is entirely composed of partitioning wall members.

The housing 31 of the combustible gas supply unit 2 includes the base plate 32 on which the high pressure gas facility 6 (the compressor 22) is placed, the pillars 34 provided upright on the base plate 32 and the top plate 33 provided on the pillars 34 so as to oppose the base plate 32. The first rear side plate 51 substantially composed of the partitioning wall member is fixed to the base plate 32, the pillars 34 and the top plate 33 by welding the entire joined sections. In this manner, the first rear side plate 51 can be fixed tightly to the base plate 32, the pillars 34 and the top plate 33. This prevents the first rear side plate 51 from being blown off by the explosion of hydrogen gas in the high pressure gas handling area A1.

The first rear side plate 51 is not necessarily fixed to all of the base plate 32, the pillars 34 and the top plate 33 by welding the entire joined sections, but may be fixed to one or two of the base plate 32, the pillars 34 and the top plate 33 by welding the entire joint section.

Second Embodiment

A combustible gas supply unit 2A and a hydrogen station 1A according to a second embodiment of the present invention will now be described with reference to FIGS. 5 and 6. The combustible gas supply unit 2A and the hydrogen station 1A according to the second embodiment is basically configured similar to the first embodiment but different in the configuration of the high pressure gas facility 6. Only the difference from the first embodiment will be described below.

Figure 5:
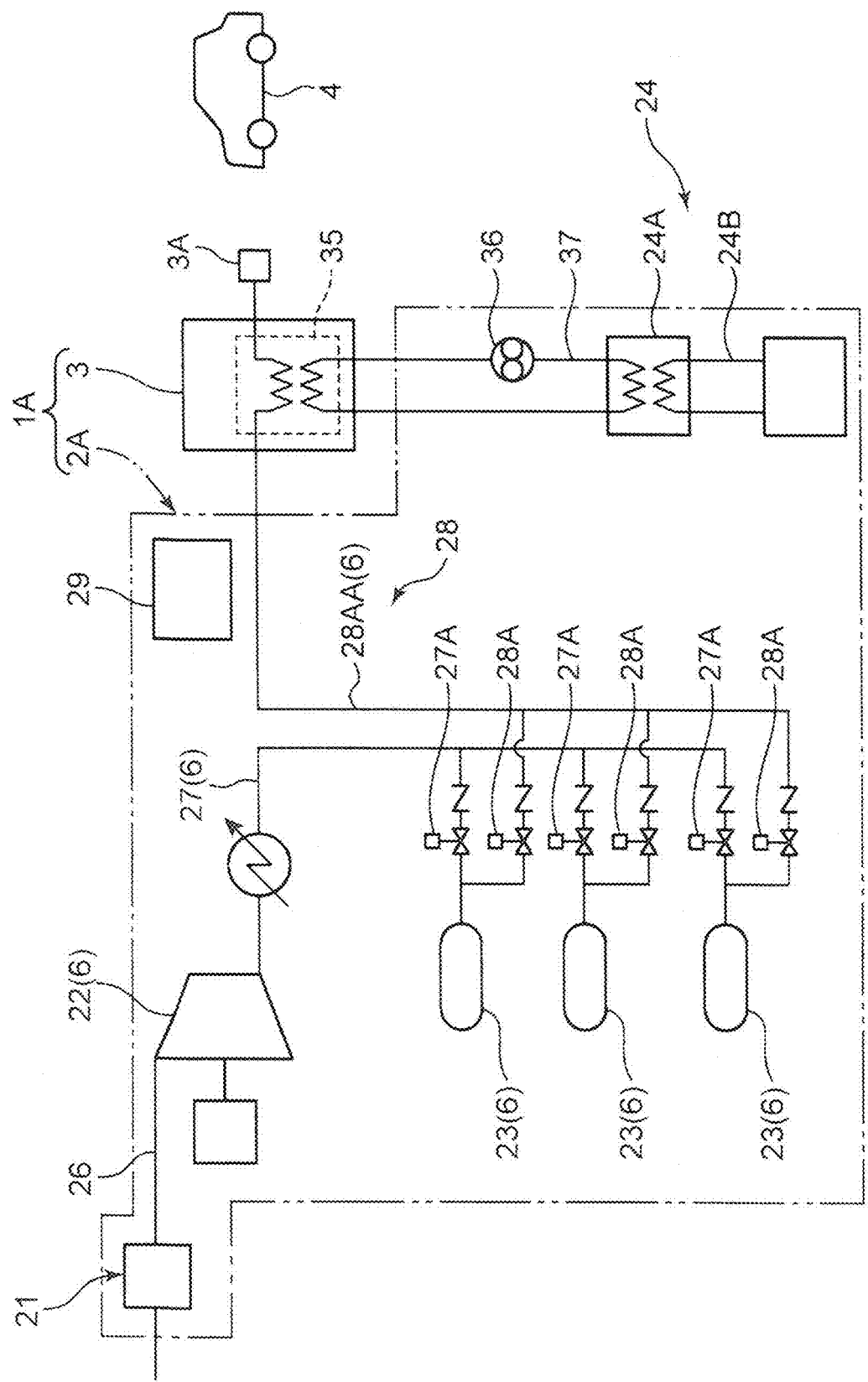
FIG. 5 schematically illustrates an overall configuration of a hydrogen station according to a second embodiment of the present invention.

As illustrated in FIG. 5, the combustible gas supply unit 2A comprises, in addition to the compressor 22 and the gas in-flow line 27, an accumulator 23 and a gas out-flow line 28. In the second embodiment, the compressor 22, the accumulator 23, the gas in-flow line 27 and an upstream portion 28AA of the gas out-flow line 28 are a high pressure gas facility 6. That is, the high pressure gas facility 6 according to the second embodiment includes a facility that stores the compressed hydrogen gas (the accumulator 23) in addition to the facility that generates compressed hydrogen gas (the compressor 22) and the facility in which the compressed hydrogen gas flows (the gas in-flow line 27 and the gas out-flow line 28). The upstream portion 28AA of the gas out-flow line 28 constituting the high pressure gas facility 6 is connected to the gas in-flow line 27 and contained in the housing 31 as illustrated in FIG. 6. Thus, the hydrogen station 1A according to the second embodiment includes the combustible gas supply unit 2A that supplies hydrogen gas to the dispenser 3 and the dispenser 3 for supplying the hydrogen gas supplied from the combustible gas supply unit 2A to the fuel cell vehicle 4.

Figure 6:
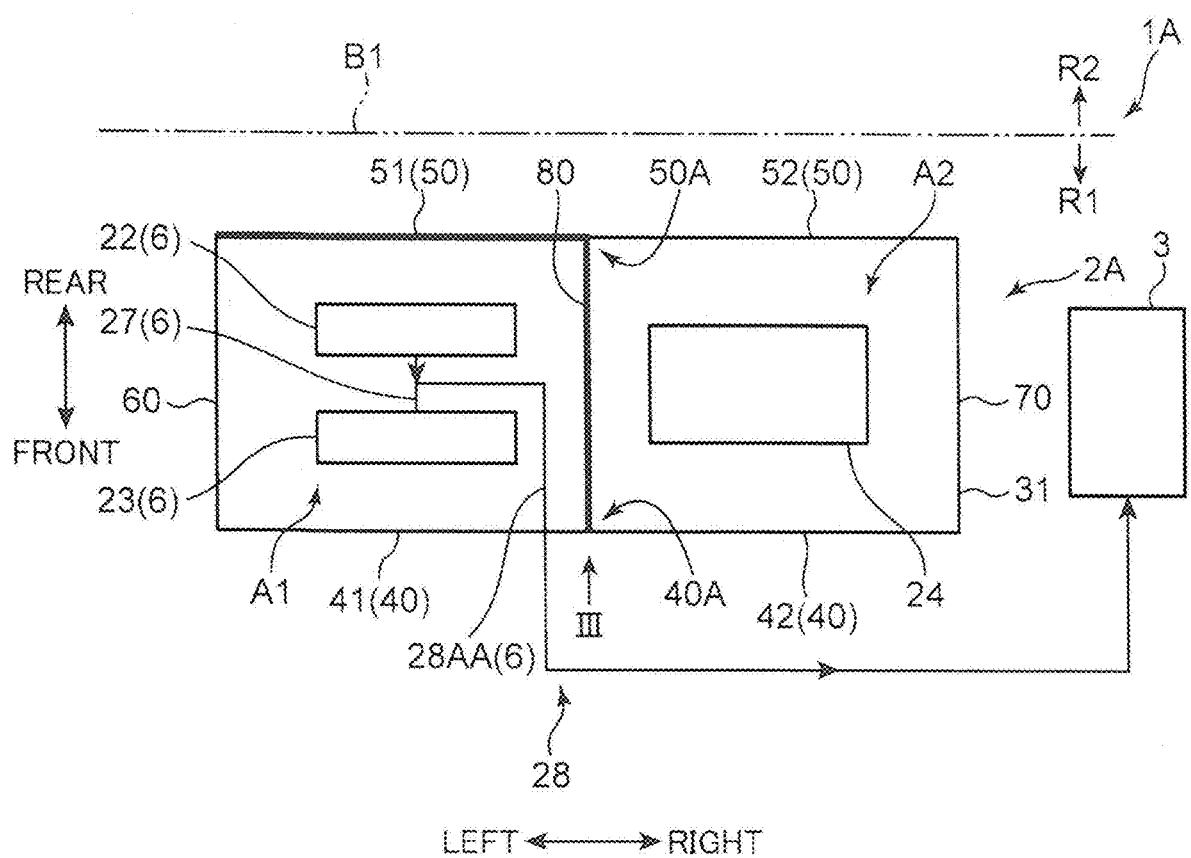
FIG. 6 schematically illustrates a top view of a configuration of a combustible gas supply unit according to the second embodiment of the present invention.

In the second embodiment as illustrated in FIG. 6, the compressor 22, the accumulator 23, the gas in-flow line 27 and the upstream portion 28AA of the gas out-flow line 28 are contained in the high pressure gas handling area A1 inside the housing 31. Similarly to the first embodiment, the first rear side plate 51 substantially composed of the partitioning wall member suppresses, in case of the explosion of hydrogen gas in the high pressure gas handling area A1, the impact of explosion from reaching the outer region R2 of the premises R1.

Third Embodiment

A hydrogen station 1B according to a third embodiment of the present invention will be described with reference to FIG. 7. The hydrogen station 1B according to the third embodiment is basically configured similar to the first embodiment but is different in that the hydrogen station 1B has no accumulator 23. Only the difference from the first embodiment will be described below.

Figure 7:
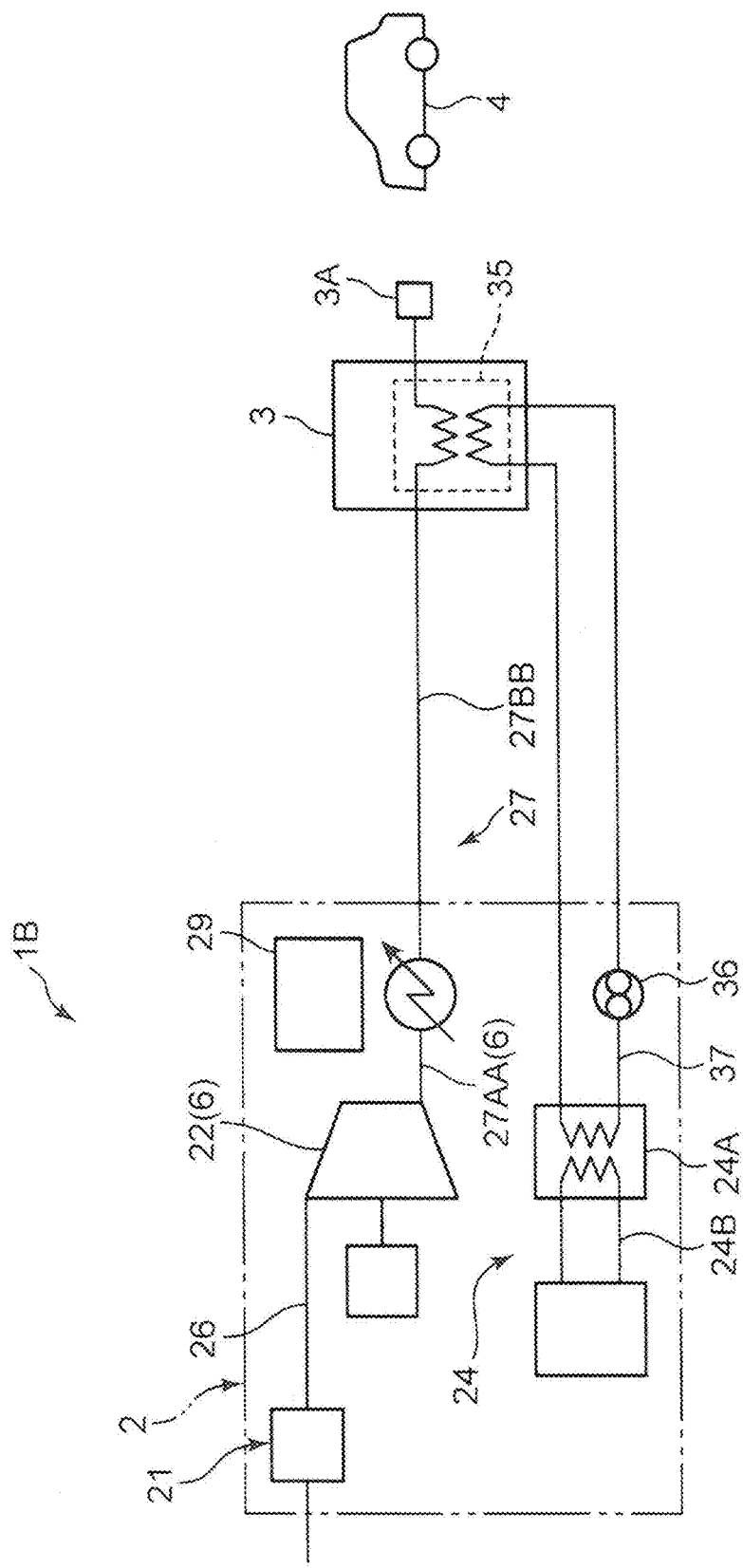
FIG. 7 schematically illustrates an overall configuration of a hydrogen station according to a third embodiment of the present invention.

As illustrated in FIG. 7, the hydrogen station 1B includes no accumulator 23 (FIG. 1) and has a gas in-flow line 27 connected to a pre-cooler 35 of the dispenser 3. Specifically, the gas in-flow line 27 includes an upstream portion 27AA that is connected to the outlet of the compressor 22 and contained in the housing 31 (FIG. 2), and a downstream portion 27BB that is connected to the dispenser 3 (pre-cooler 35) and disposed outside the housing 31. Thus, the high pressure hydrogen gas discharged from the compressor 22 is directly supplied to the pre-cooler 35 through the gas in-flow line 27. Similarly to the first and second embodiments, this embodiment suppresses the impact of the explosion of hydrogen gas inside the housing from reaching the outer region R2 of the hydrogen station 1B.

Fourth Embodiment

A combustible gas supply unit according to a fourth embodiment of the present invention will now be described with reference to FIG. 8. The combustible gas supply unit according to the fourth embodiment is basically configured similar to the combustible gas supply unit 2 according to the first embodiment but different in that an inlet is provided in the first rear side plate 51 to allow access to the inside of the housing 31 by a worker and a stopper is provided to prevent a door that opens and closes the inlet from being blown to the outside the housing 31 by the impact of the explosion of hydrogen gas. Only the difference from the first embodiment will be described below.

Figure 8:
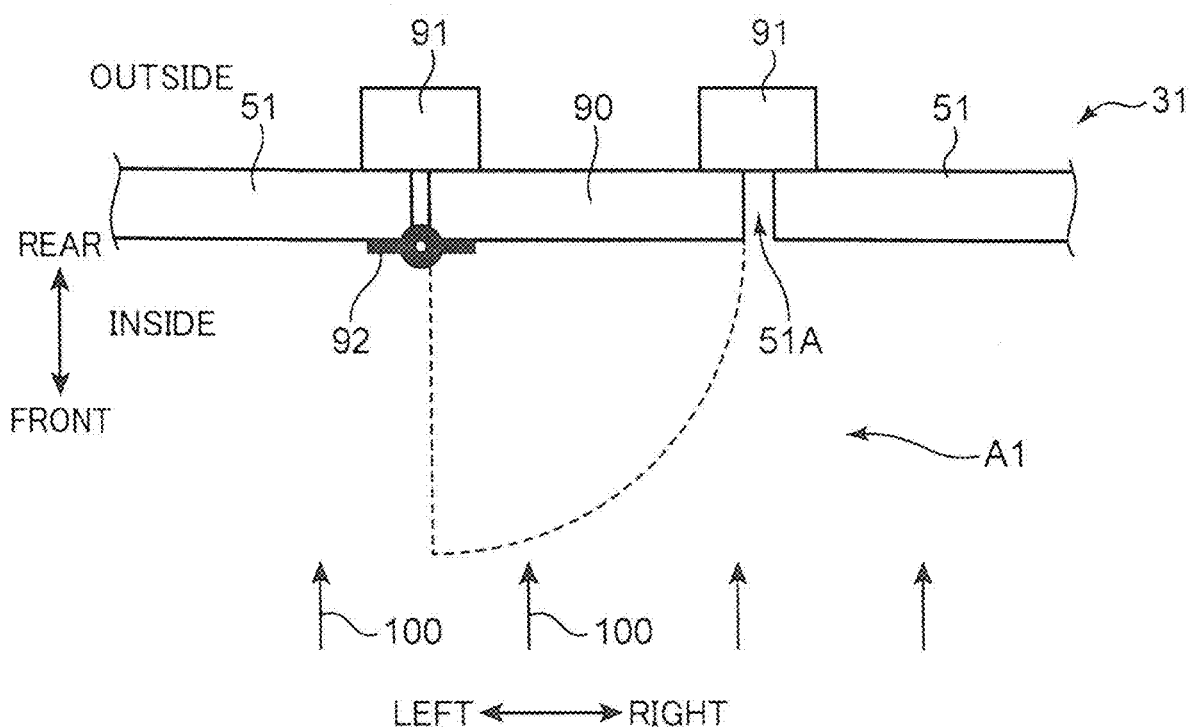
FIG. 8 schematically illustrates a stopper structure of a door of a combustible gas supply unit according to a fourth embodiment of the present invention.

FIG. 8 illustrates only a portion of the first rear side plate 51 of the housing 31. As illustrated in FIG. 8, an inlet 51A is provided in the first rear side plate 51 to allow the worker to enter the housing 31. The combustible gas supply unit according to the fourth embodiment includes a door 90 that opens and closes the inlet 51A, and a stopper 91 that holds the door 90.

The door 90 has an in-swinging structure. That is, as illustrated in FIG. 8, an end (the left end) of an inner face of the door 90 is fixed to an inner face of the first rear side plate 51 (an inner face near the inlet 51A) by an attachment 92, such as a hinge. The door 90 can pivot about the attachment 92 to the inside of the housing 31 away from the first rear side plate 51. The door 90 may have an in-swinging structure that allows the door 90 to pivot to the inside about the right end in FIG. 8.

The stoppers 91 are provided separately from the first rear side plate 51 and fixed to an outer side of the housing 31 so as to overlap the right and left ends of the door 90. In a rear side view of the housing 31, the stoppers 91 overlap the right and left ends of the door 90 to hide the right and left ends of the door 90. In the present embodiment, the stoppers 91 are disposed so as to come in contact with an outer face of the first rear side plate 51 and an outer face of the door 90. The stoppers 91 hold the door 90 against the force that acts on the door 90 from inside the housing 31, which force is caused by the impact 100 of the explosion of hydrogen gas in the high pressure gas handling area A1. Since the stoppers 91 prevent the door 90 from being blown off, safety of the hydrogen station is secured.

Furthermore, in the present embodiment, the stopper 91 has a thickness equal to or larger than the thickness of the first rear side plate 51. Having such a thickness, the stopper 91 can hold the door 90 against a larger force, which further surely prevents the door 90 from being blown off by the impact 100 of the explosion of hydrogen gas.

The stoppers 91 may be disposed not only to hold right and left ends of the door 90 but to hold the top end of the door 90. Furthermore, the stoppers 91 are not necessarily disposed so as to come in contact with the outer face of the first rear side plate 51 and the outer face of the door 90. There may be a gap between the stopper 91 and the outer face. The door and the stopper structure described in the embodiment may be used in the combustible gas supply unit 2A according to the second embodiment.

Fifth Embodiment

A combustible gas supply unit according to a fifth embodiment of the present invention will now be described with reference to FIG. 9. The combustible gas supply unit according to the fifth embodiment is basically configured similar to the combustible gas supply unit according to the fourth embodiment but is different in that the door for opening and closing the inlet 51A of the housing 31 is a sliding type. Only the difference from the fourth embodiment will be described below.

Figure 9:
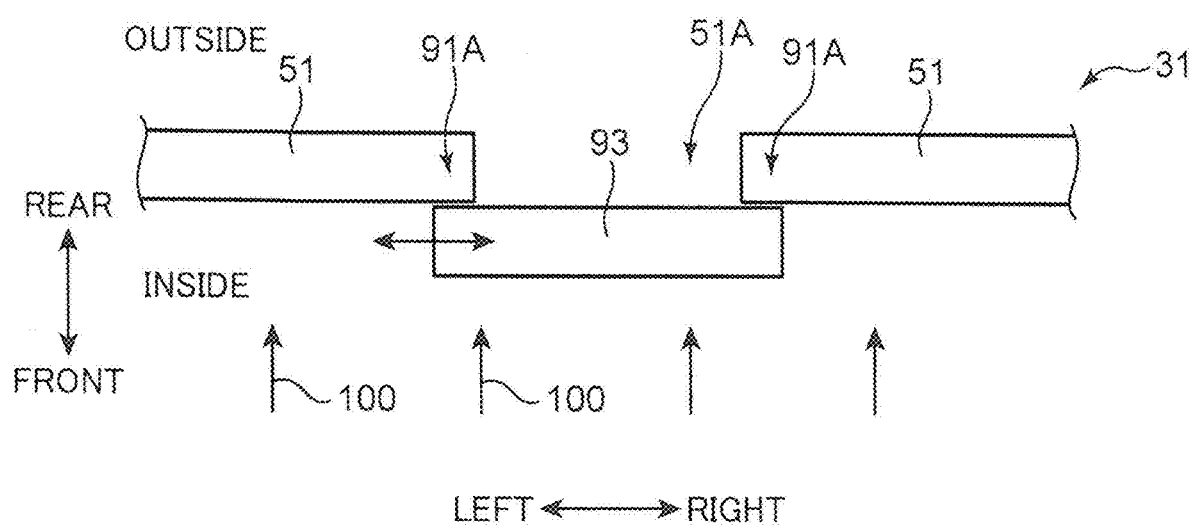
FIG. 9 schematically illustrates a stopper structure of a door of a combustible gas supply unit according to a fifth embodiment of the present invention.

As illustrated in FIG. 9, a door 93 has a sliding door structure and slides inside the housing 31 along the first rear side plate 51. That is, the inlet 51A can be opened and closed by sliding the door 93 along the first rear side plate 51.

FIG. 9 illustrates the inlet 51A closed by the door 93. In this state, portions 91A constituting the inlet 51A in the first rear side plate 51 overlap the right and left ends of the door 93. In the present embodiment, the portions 91A serve as the stoppers and prevent the door 93 from being blown off to the outside of the housing 31 by the impact of the explosion of hydrogen gas. That is, a portion of the first rear side plate 51 is used as the stopper of the door 93 in the present embodiment.

Other Embodiment

The first embodiment is described for a case of hydrogen gas as an example combustible gas. However the combustible gas is not limited to hydrogen gas. Another example combustible gas may be, for example, a hydrocarbon gas such as methane, propane and acetylene. The same can be said for the second to fifth embodiments.

The first embodiment is described for a case where the first partitioning plate 80 is substantially composed of the partitioning wall member. However, the first partitioning plate 80 is not necessarily composed of the partitioning wall member. The same can be said for the second to fifth embodiments.

The first embodiment is described for a case where the controller area A3 is provided below the freezer area A2. The present invention is not limited to such a configuration. The controller area A3 may be provided above the freezer area A2. The same can be said for the second to fifth embodiments.

The fourth and fifth embodiment are described for the cases where the door 90 or 93 is provided only in the first rear side plate 51 substantially composed of the partitioning wall member. However, a door may be provided in another side plate which is not substantially composed of a partitioning wall member. For example, a door may be provided in the first front side plate 41 or the left side plate 60 in FIG. 2. Furthermore, a door may be provided only in a side plate which is not substantially composed of a partitioning wall member. In such a case, a stopper may be omitted. When doors are provided in a plurality of side plates constituting the high pressure gas handling area A1, all doors may have an in-swinging structure or a sliding door structure, or alternatively, the doors may be a combination of in-swinging structures and sliding-door structures.

The first embodiment is described for the cases where only the first rear side plate 51 among the side plates of the housing 31 is substantially composed of the partitioning wall member. The present invention is not limited to such a configuration. The first front side plate 41 and the left side plate 60 may also be substantially composed of the partitioning wall members. The same can be said for the second to fifth embodiments.

The embodiments are summarized as below.

The combustible gas supply unit according to the present embodiments is installed on premises of a facility for supplying combustible gas as a fuel. The combustible gas supply unit comprises a high pressure gas facility for handing the combustible gas which is compressed and a housing provided with a high pressure gas handling area containing the high pressure gas facility. The housing has a portion that is disposed in a side close to a boundary between the premises and an outer region of the premises and constitutes the high pressure gas handling area, and the portion is substantially composed of a partitioning wall member that resists an impact of an explosion of the combustible gas.

In the combustible gas supply unit, the high pressure gas facility for handling combustible gas is contained in the housing, and thus the impact of the explosion of combustible gas is suppressed from reaching the outside of the housing. The portion of the housing that is disposed in the side close to the boundary and constitutes the high pressure gas handling area is composed of a partitioning wall member. Therefore, even if the combustible gas supply unit is provided near the boundary, the partitioning wall member suppresses the impact of the explosion of combustible gas from reaching the outer region. Consequently, an excellent partitioning wall structure can be provided. Furthermore, using a portion of the housing as the partitioning wall member drastically reduces cost compared to constructing an additional partitioning wall on the ground of the premises as in the prior art.

The combustible gas supply unit may further comprises a freezer used for cooling the combustible gas which is compressed and a partitioning plate that partitions a space inside the housing and is substantially composed of a partitioning wall member that resists an impact of an explosion of the combustible gas. The housing has inside a freezer area that contains the freezer and is isolated from the high pressure gas handling area by the partitioning plate.

With this configuration, the partitioning plate prevents the impact of the explosion of combustible gas in the high pressure gas handling area from reaching the freezer. The freezer can thus be protected.

The combustible gas supply unit may further comprises a controller that controls an operation of the combustible gas supply unit. The housing has inside a control area that contains the controller and is provided above or below the freezer area, the control area may be isolated from the high pressure gas handling area by the partitioning plate.

With this configuration, the partitioning plate prevents the impact of the explosion of combustible gas in the high pressure gas handling area from reaching the controller, and thus the controller is protected. Since a single partitioning plate can protect both the freezer and the controller, the number of partitioning plates can be reduced.

In the combustible gas supply unit, the portion of the housing that is substantially composed of the partitioning wall member may be provided with an inlet to an inside of the housing. The combustible gas supply unit may further comprises a door that opens and closes the inlet and a stopper that holds the door against a force that acts on the door from inside the housing, which force is caused by an impact of an explosion of the combustible gas.

With this configuration, the door is prevented from being blowing off by a strong impact acting from inside the housing in a case of the explosion of combustible gas in the high pressure gas handling area.

In the combustible gas supply unit, the stopper may have a thickness equal to or larger than a thickness of the portion of the housing that is substantially composed of the partitioning wall member.

With this configuration, blowing off of the door by the impact of the explosion of combustible gas can surely be prevented.

In the combustible gas supply unit, the door may have an in-swinging structure to pivot to an inside of the housing away from the portion of the housing that is substantially composed of the partitioning wall member. The stopper may be a member disposed outside the housing so as to overlap the door.

In this configuration, the stopper is substantially composed of a member disposed outside the housing, and thus the member can be designed to have a thickness that surely prevents the door from being blowing off.

In the combustible gas supply unit, the door may have a sliding door structure to slide inside the housing along the portion of the housing that is substantially composed of the partitioning wall member. A portion of the housing that constitutes the inlet of the housing may serve as the stopper.

With this configuration, using the portion of the housing as the stopper, the stopper structure can be simplified.

In the combustible gas supply unit, only a portion of the housing, that is disposed in the side close to the boundary between the premises and the outer region of the premises and constitutes the high pressure gas handling area may be substantially composed of the partitioning wall member.

With this configuration, an excellent partitioning wall structure can be provided and at the same time, the cost of manufacturing the housing can be reduced compared to the cost of manufacturing the housing that is entirely composed of partitioning wall members. Furthermore, designing of the housing can be simplified.

In the combustible gas supply unit, the housing may comprise a base plate on which the high pressure gas facility is placed, a pillar provided upright on the base plate and a top plate provided on the pillar so as to oppose the base plate. The portion of the housing that is substantially composed of the partitioning wall member may be fixed to at least one of the base plate, the pillar and the top plate by welding an entire joined section.

With this configuration, the portion of the housing that is substantially composed of the partitioning wall member can be fixed tightly to the base plate, the pillars or the top plate. Consequently, the partitioning wall member can be prevented from being blown off by an explosion of combustible gas in the high pressure gas handling area.

The hydrogen station according to the present embodiment comprises the above combustible gas supply unit that supplies hydrogen gas which is the combustible gas to an accumulator or a dispenser and the dispenser for supplying hydrogen gas supplied from the accumulator or the combustible gas supply unit to a fuel cell vehicle.

The hydrogen station comprises the above combustible gas supply unit according to the present embodiment, and thus safety against the explosion of hydrogen gas can be secured with low cost.

This application is based on Japanese Patent Application No. 2017-146584 filed in Japan Patent Office on Jul. 28, 2017 and 2018-026840 filed in Japan Patent Office on Feb. 19, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A combustible gas supply unit installed on premises of a facility for supplying combustible gas as a fuel, the combustible gas supply unit comprising:
   a high pressure gas facility for handling the combustible gas which is compressed; and
   a housing provided with a high pressure gas handling area containing the high pressure gas facility, wherein
   the housing includes a plurality of side plates forming the high pressure gas handling area, and
   one of the plurality of side plates is substantially composed of a partitioning wall member that resists an impact of an explosion of the combustible gas, and has a thickness larger than a thickness of the others of the plurality of side plates.

2. The combustible gas supply unit according to claim 1, further comprising:
   a freezer used for cooling the combustible gas which is compressed; and
   a partitioning plate that partitions a space inside the housing and is substantially composed of a partitioning wall member that resists an impact of an explosion of the combustible gas, wherein
   the housing has inside a freezer area that contains the freezer and is isolated from the high pressure gas handling area by the partitioning plate.

3. The combustible gas supply unit according to claim 2, further comprising a controller that controls an operation of the combustible gas supply unit, wherein
   the housing has inside a control area that contains the controller and is provided above or below the freezer area, the control area being isolated from the high pressure gas handling area by the partitioning plate.

4. The combustible gas supply unit according to claim 1, wherein
   the one of the plurality of side plates that is substantially composed of the partitioning wall member is provided with an inlet to an inside of the housing, and
   the combustible gas supply unit further comprises:
   a door that opens and closes the inlet; and
   a stopper that holds the door against a force that acts on the door from inside the housing, which force is caused by an impact of an explosion of the combustible gas.

5. The combustible gas supply unit according to claim 4, wherein
   the stopper has a thickness equal to or larger than a thickness of the one of the plurality of side plates that is substantially composed of the partitioning wall member.

6. The combustible gas supply unit according to claim 4, wherein
   the door has an in-swinging structure to pivot to an inside of the housing away from the one of the plurality of side plates that is substantially composed of the partitioning wall member, and
   the stopper is a member disposed outside the housing so as to overlap the door.

7. The combustible gas supply unit according to claim 4, wherein
   the door has a sliding door structure to slide inside the housing along the one of the plurality of side plates that is substantially composed of the partitioning wall member, and
   a portion of the housing that constitutes the inlet of the housing serves as the stopper.

8. The combustible gas supply unit according to claim 1, wherein
   only a portion of the housing is substantially composed of the partitioning wall member.

9. The combustible gas supply unit according to claim 1, wherein
   the housing comprises:
   a base plate on which the high pressure gas facility is placed,
   a pillar provided upright on the base plate; and
   a top plate provided on the pillar so as to oppose the base plate,
   one of the plurality of side plates that is substantially composed of the partitioning wall member is fixed to at least one of the base plate, the pillar and the top plate by welding an entire joined section.

10. A hydrogen station comprising:
    the combustible gas supply unit according to claim 1 that supplies hydrogen gas which is the combustible gas to an accumulator or a dispenser; and
    the dispenser for supplying hydrogen gas supplied from the accumulator or the combustible gas supply unit to a fuel cell vehicle.

11. The combustible gas supply unit according to claim 1, wherein
    the partitioning wall member is composed of a steel plate.

* * * * *